United States Patent
Bates et al.

(10) Patent No.: US 12,142,973 B1
(45) Date of Patent: Nov. 12, 2024

(54) ROTOR FOR SWITCH RELUCTANCE ELECTRICAL MOTOR WITH TEETH HAVING IRREGULAR CROSS-SECTIONAL PROFILE

(71) Applicant: Monumo Limited, Saffron Walden (GB)

(72) Inventors: Daniel Bates, Saffron Walden (GB); Kevin Bersch, Saffron Walden (GB); William Gallafent, Saffron Walden (GB); Jaroslaw Pawel Rzepecki, Saffron Walden (GB); Alexey Kostin, Saffron Walden (GB); Jonathan Rayner, Saffron Walden (GB); Markus Kaiser, Saffron Walden (GB); Nicolas Durrande, Saffron Walden (GB); Rupert Tombs, Saffron Walden (GB); Ian Murphy, Saffron Walden (GB); Xiaoyan Wang, Saffron Walden (GB); Pierre Guern, Saffron Walden (GB); Bhaskar Sen, Saffron Walden (GB)

(73) Assignee: Monumo Limited, Essex (GB)

( * ) Notice: Subject to any disclaimer, the term of this patent is extended or adjusted under 35 U.S.C. 154(b) by 0 days.

(21) Appl. No.: 18/495,678

(22) Filed: Oct. 26, 2023

(51) Int. Cl.
  *H02K 1/24* (2006.01)
  *H02K 11/33* (2016.01)
(52) U.S. Cl.
  CPC ............... *H02K 11/33* (2016.01); *H02K 1/24* (2013.01); *H02K 2213/03* (2013.01)
(58) Field of Classification Search
  CPC ........ H02K 1/24; H02K 1/246; H02K 2213/03

USPC .... 310/216.096, 216.097, 216.107, 216.111, 310/216.075
See application file for complete search history.

(56) References Cited

U.S. PATENT DOCUMENTS

| | | | |
|---|---|---|---|
| 2013/0257188 A1* | 10/2013 | Raminosoa | H02K 19/24 310/46 |
| 2018/0159415 A1* | 6/2018 | Kudligi | H02K 1/14 |
| 2019/0173335 A1* | 6/2019 | Ramakrishna | F01D 15/10 |

FOREIGN PATENT DOCUMENTS

| | | | |
|---|---|---|---|
| CN | 105207434 A | * | 12/2015 |
| CN | 208112478 U | * | 11/2018 |
| JP | 2015171181 A | * | 9/2015 |

OTHER PUBLICATIONS

Shi, Machine Translation of CN208112478, Nov. 2018 (Year: 2018).*

(Continued)

*Primary Examiner* — Eric Johnson
(74) *Attorney, Agent, or Firm* — HARNESS, DICKEY & PIERCE, P.L.C.

(57) ABSTRACT

A switched reluctance electrical motor comprises a rotor having a substantially circular cylindrical envelope with a diameter in a range of 50 mm to 300 mm and a length in the range of 20 mm to 250 mm. The rotor comprises a plurality of radially extending rotor teeth. A switched reluctance electrical motor further comprises a stator surrounding the rotor and comprising a plurality of stator poles. The rotor teeth are circumferentially-spaced apart from each other to define slots between adjacent teeth that, expressed in normalised angular and radial coordinates, have a cross-sectional profile transverse to an axis of rotation of the rotor, lying within a well-defined polygonal region.

7 Claims, 8 Drawing Sheets

(56) References Cited

OTHER PUBLICATIONS

Sudo, Machine Translation of CN105207434, Dec. 2015 (Year: 2015).*
Sudo, Machine Translation of JP2015171181, Sep. 2015 (Year: 2015).*

* cited by examiner

| | |
|---|---|
| $r_{min}$ | 15.0 mm |
| $r_{max}$ | 25.0 mm |
| $\phi_{min}$ | 17.89 deg |
| $\phi_{max}$ | 72.11 deg |
| Shaft diameter | 12.0 mm |
| $n_r$ | 4 |

| $r_{min}$ | 57.375 mm |
| --- | --- |
| $r_{max}$ | 67.5 mm |
| $\phi_{min}$ | 2.21 deg |
| $\phi_{max}$ | 9.40 deg |
| Shaft diameter | 97.0 mm |
| $n_r$ | 31 |

| | |
|---|---|
| $r_{min}$ | 135.0 mm |
| $r_{max}$ | 150.0 mm |
| $\phi_{min}$ | 1.34 deg |
| $\phi_{max}$ | 6.16 deg |
| Shaft diameter | 220.0 mm |
| $n_r$ | 48 |

ROTOR FOR SWITCH RELUCTANCE ELECTRICAL MOTOR WITH TEETH HAVING IRREGULAR CROSS-SECTIONAL PROFILE

TECHNICAL FIELD

The present disclosure relates to rotors for switched reluctance electrical motors and switched reluctance electrical motors comprising such rotors.

BACKGROUND

A switched reluctance motor (SRM) is a type of electrical motor. The stator of a SRM has windings to which switching currents are delivered to drive the motor, while the rotor has no windings or permanent magnets. It is known that conventional SRM designs suffer from torque ripple, i.e. a periodic increase or decrease in output torque as the rotor and motor shaft rotate. Torque ripple can be particularly strong and problematic in high-torque SRMs. Thus, there is a need to provide improved SRMs that deliver high torque and exhibit low torque ripple.

SUMMARY

According to a first aspect of the invention, there is provided a switched reluctance electrical motor as defined in claim 1.

Embodiments of the present invention may enable switched reluctance motors that deliver high torque and exhibit low torque ripple. Embodiments may achieve this by providing rotor teeth having a transverse cross-sectional profile that is irregular but which is selected from a well-defined group of profiles.

According to a second aspect of the invention, there is provided a system as defined in claim 8.

BRIEF DESCRIPTION OF THE DRAWINGS

FIGS. 8A-10B illustrate further example rotors.

DETAILED DESCRIPTION

A rotor of a conventional switched reluctance motor (SRM) is typically provided with regularly shaped teeth, i.e. with each tooth having a flat or arcuate tip opposed to the stator and having generally straight or arcuate sidewalls. To enable electrical motors that deliver high torque and exhibit low torque ripple, embodiments described herein propose a rotor with rotor teeth of an irregular shape. In other words, the teeth, and therefore the slots between adjacent teeth, have a transverse cross-sectional profile that is irregular but which is selected from a well-defined group of profiles. A particular example embodiment is described below with reference to FIGS. 1 to 4. The identified group of rotor slot profiles is then described in detail with reference to FIGS. 5 to 7, and further example embodiments are described with reference to FIGS. 8A to 10B.

Figure 1:
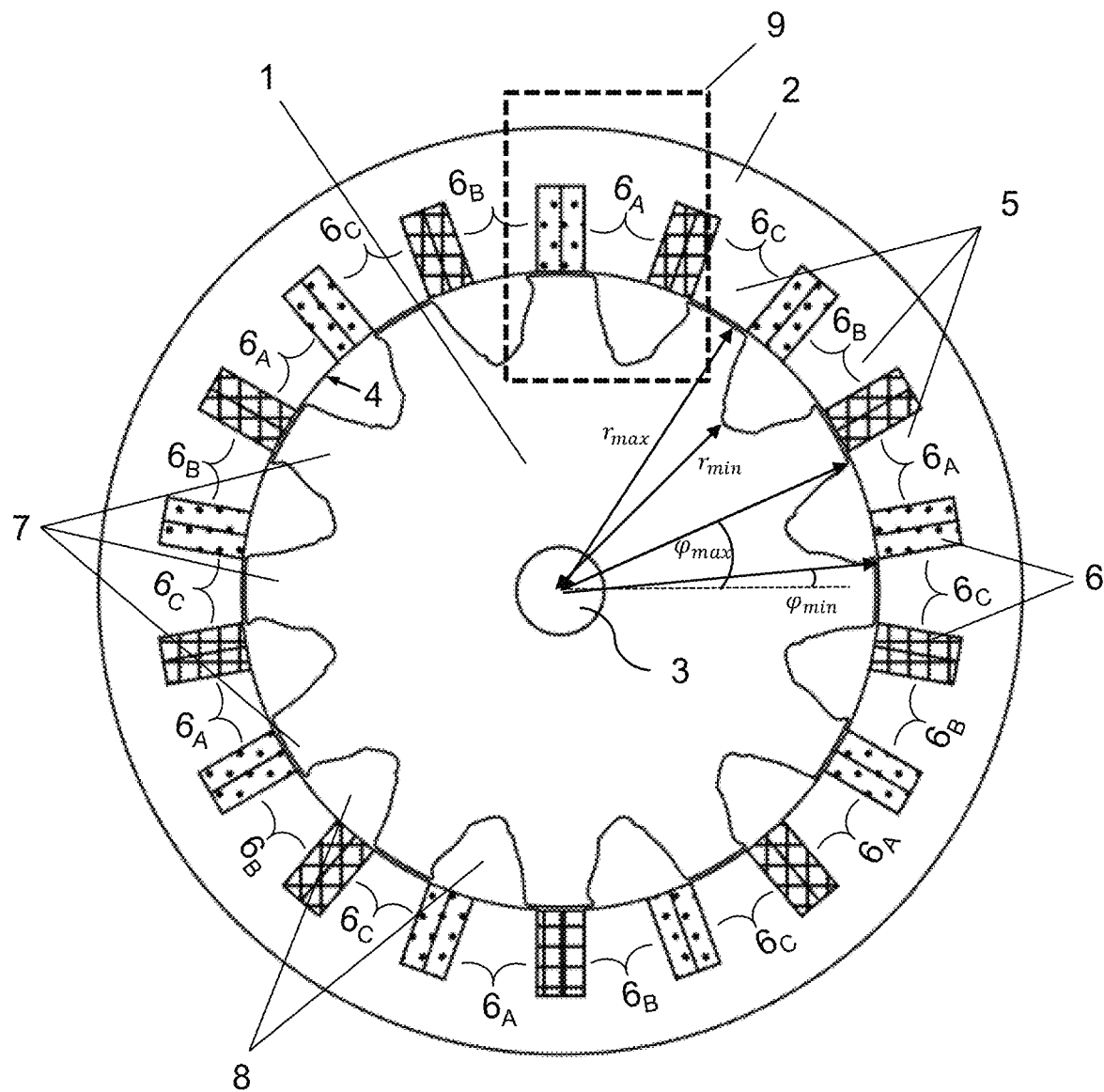
FIG. 1 is a cross-sectional view of a stator and a rotor according to an embodiment.

With reference to FIG. 1, a switched reluctance motor comprising an inner rotor 1 and an outer stator 2 will now be described. The rotor 1 is configured to be rotatable around a rotational axis of the rotor 1 (which is perpendicular to the plane of the cross-sectional view of FIG. 1) and to cooperate with the stator 2, during use of the electrical motor, to provide a torque to a shaft 3. In particular, during use of the electrical motor, the rotor 1 may rotate counterclockwise (in the view of FIG. 1). It is to be understood that the electrical motor may also be operated to rotate the rotor 1 clockwise (however, in general, the "irregular" rotor teeth described in this specification are predominantly beneficial for one rotational direction, i.e. to the "counterclockwise" operation of the electrical motor in the view of FIG. 1).

The stator 2 has a generally tubular shape and comprises an inner surface 4 which, in the cross-sectional view of FIG. 1, has a generally circular shape. The stator 2 defines a plurality of circumferentially-spaced slots which extend from the inner surface 3 radially outwards to form a corresponding plurality of stator teeth 5. Respective wound field coils 6 are provided around the stator teeth 5. These coils 6 are conductive, and are configured to provide an electromagnetic field within the motor when driven by a current. By selectively driving the coils 6, the magnetic field within the motor may be rotated, causing the rotor 1 to be driven to rotate (FIG. 1 includes crosses "x" and dots "." within the coils 6 to respectively represent electrical currents coming out or going into the respective plane at any given moment in time, when the motor is in use). It is to be understood that the stator 2 may be a conventional SRM stator and the stator teeth may have a conventional, regular shape. In the embodiment of FIG. 1, the stator 2 has an outer radius of 132.0 mm and an inner radius of 91.0 mm (i.e. the inner surface 4 of the stator 2 has a radius of 91.0 mm in the view of FIG. 1).

Figure 2:
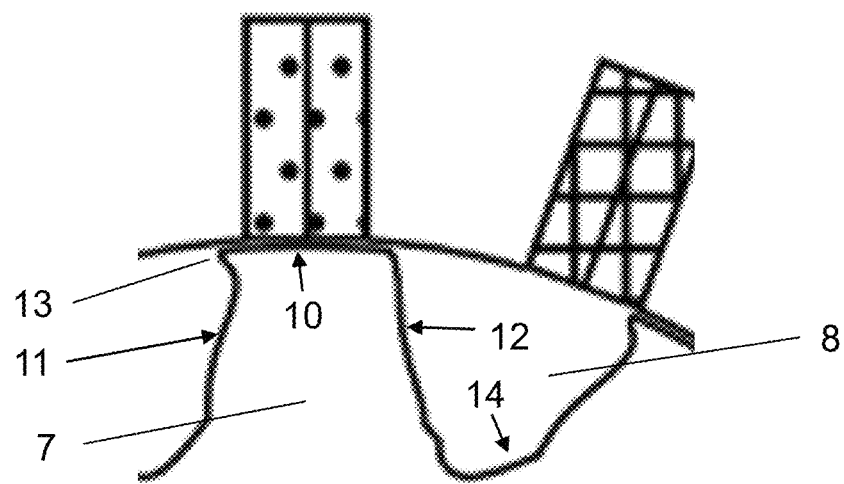
FIG. 2 illustrates a detail of the stator and rotor of FIG. 1.

The rotor 1 has a substantially circular cylindrical envelope and comprises a plurality of radially extending rotor teeth 7 circumferentially-spaced apart from each other to define slots 8 between adjacent teeth. The slots 8 extend co-axially along an otherwise circular cylindrical rotor 1. This means that the teeth 7 (and correspondingly the slots 8) have the same cross-sectional profile along the entire length of the rotor 1 (rotor skew can be implemented as required). FIG. 2 is a close-up of a portion 9 of the SRM of FIG. 1, showing one of the rotor teeth 7 in more detail (each rotor tooth 7 has generally the same shape). In the cross-sectional view of FIG. 2, the teeth 7 have a generally smooth, curved radially outer surface and "irregularly" shaped sidewalls 11,12. In the illustrated example, the sidewalls 11,12 of any given tooth are asymmetric, i.e. the "sidewalls" 11, 12 are not mirror images of each other (e.g. unlike the rightmost sidewall 12, the leftmost sidewall 11 comprises an overhanging portion 13). The rotor 1 and the stator 2 are dimensioned so that a small air gap is provided between the rotor teeth 7 and the stator 2. In the embodiment of FIG. 1, the air gap is 1 mm.

As the cross-section of the rotor 1 generally exhibits a $n_r$-fold rotation symmetry (where $n_r$ is the number of rotor teeth 7 or slots 8, i.e. $n_r=12$ in the embodiment of FIG. 1) around the rotational axis of the rotor 1, the surface profile 14 of the slots 8 may be expressed conveniently using a polar coordinate system centred on the rotational axis of the rotor 1, that is using polar coordinates comprising a radial coordinate defining a distance from the centre of the rotational axis and an angular coordinate defining an angle from a reference direction. Further, the rotor slot surface profile 14 may be expressed in normalised radial and angular coordinates.

In particular, the "normalised radial coordinate $r_{norm}$" may be defined by $$r_{norm} = \frac{r_0 - r_{min}}{r_{max} - r_{min}},$$

where $r_0$ is the distance from the rotational axis, $r_{min}$ is minimum radius of the rotor 1 (i.e. the shortest distance from the rotational axis to the surface profile 14 of the rotor slot 8), and $r_{max}$ is the rotor's outer diameter, as illustrated in FIG. 1. The normalised radial coordinate may take values in the interval $0 \leq r_{norm} \leq 1$ (since $r_{min} \leq r_{norm} \leq r_{max}$). For the particular embodiment of FIGS. 1 and 2, the values for minimum and maximum radius are $r_{min}$=66.8 mm and $r_{max}$=90.0 mm (the diameter of the shaft 3 of FIG. 1 is 25 mm).

Similarly, the "normalised angular coordinate $\varphi_{norm}$" may be defined by $$\varphi_{norm} = \frac{\varphi_0 - \varphi_{min}}{\varphi_{max} - \varphi_{min}}$$

where $\varphi_0$ is the angle from a reference direction (by convention $\varphi_0$ may increase in counter-clockwise direction), $\varphi_{min}$ and $\varphi_{max}$ are angles indicating the end points of one example slot 8 in clockwise direction (as illustrated in FIG. 1). It is to be understood that $\varphi_{norm}$ is independent of the choice of the reference direction. Unlike the normalised radial coordinate $r_{norm}$, the value of the normalised angular coordinate $\varphi_{norm}$ is not restricted to the interval between 0 and 1. For the particular embodiment of FIGS. 1 and 2, the values for $\varphi_{min}$ and $\varphi_{max}$ are $\varphi_{min}$=6.0 deg and $\varphi_{min}$=24.0 deg.

Figure 3:
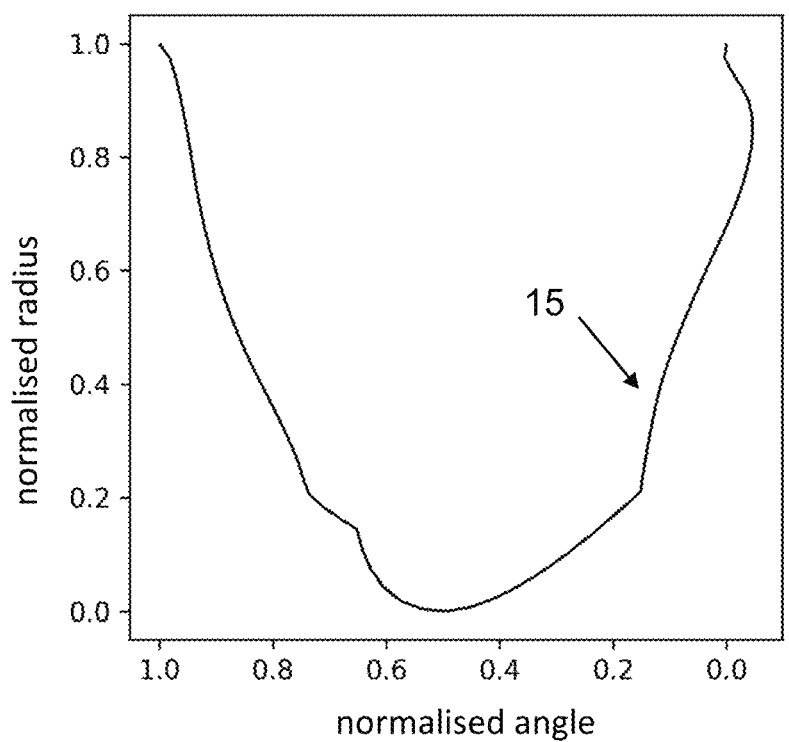
FIG. 3 illustrates a surface profile of a slot between two teeth of the rotor of FIGS. 1 and 2.

The line 15 in the graph of FIG. 3 represent the surface profile 14 of opposed sidewalls of a pair of adjacent rotor teeth 7 and which together define a slot 8, expressed in the above described normalised radial and angular coordinates. Other embodiments may comprise rotor slots having the profile 15 but having different values for the parameters $r_{min}$, $r_{max}$, $\varphi_{max}$, and $\varphi_{max}$ (corresponding example embodiments are described below with reference to FIGS. 8A to 10B).

The profile 15 can be expressed as a piecewise-linear function defined by a sequence of coordinates (i.e. each coordinate is an ordered pair comprising a normalised angular value and a normalised radial value). The profile 15 can readily be reconstructed from the sequence by linear interpolation between successive coordinates. The "Well-known text (WKT) representation" is a commonly employed representation that uses such sequences of coordinates to represent vector geometry objects (e.g. lines, polygons and other geometrical objects). A definition of the WKT format is included in the ISO-IEC 13249-3:2016 standard. The WKT representation of the profile 15, in ($\varphi_{norm}$, $r_{norm}$) coordinates, reads:

LINESTRING (0 1, 0.00373 0.97444, −0.01024 0.94839, −0.0265 0.92328, −0.03943 0.89703, −0.04526 0.86906, −0.04594 0.84067, −0.04295 0.81238, −0.03731 0.78436, −0.02967 0.75667, −0.02048 0.72929, −0.01004 0.70223, 0.00141 0.67544, 0.0137 0.64889, 0.02612 0.6224, 0.03835 0.59585, 0.05034 0.56922, 0.06206 0.54252, 0.07345 0.51572, 0.08445 0.4888, 0.09494 0.46175, 0.10476 0.43453, 0.11364 0.40709, 0.12106 0.37937, 0.12719 0.35143, 0.13293 0.32342, 0.13828 0.29537, 0.14324 0.26726, 0.14781 0.23911, 0.15199 0.21092, 0.18115 0.18429, 0.21094 0.15813, 0.24146 0.13256, 0.27285 0.10771, 0.30526 0.08379, 0.33896 0.06109, 0.37422 0.0401, 0.41151 0.02164, 0.45133 0.00728, 0.49386 0.00013, 0.53699 0.00382, 0.57613 0.01912, 0.6066 0.04458, 0.62793 0.07579, 0.64228 0.10965, 0.6517 0.14468, 0.68136 0.16329, 0.70986 0.18309, 0.73562 0.20527, 0.74613 0.2338, 0.75517 0.26362, 0.76738 0.29267, 0.78068 0.32139, 0.7946 0.34991, 0.80891 0.37829, 0.82352 0.40657, 0.83777 0.43497, 0.85102 0.4637, 0.8633 0.49273, 0.87467 0.522, 0.88515 0.5515, 0.8948 0.58119, 0.90366 0.61105, 0.91176 0.64105, 0.91914 0.67118, 0.92583 0.70142, 0.93188 0.73176, 0.9373 0.76217, 0.94216 0.79266, 0.9471 0.82313, 0.95237 0.85357, 0.9581 0.88394, 0.96448 0.91424, 0.97187 0.94438, 0.98125 0.97415, 1 1).

To generate torque, the coils 6 may be driven by temporally varying electrical currents (synchronised with the rotational position of the rotor 1). To this end, the SRM motor May comprise an inverter unit (not shown in FIG. 1) configured to provide the corresponding drive currents. Any known and suitable inverter unit may be used. In general, the drive currents are periodic and may be defined by specifying a waveform (i.e. a temporal profile of current values over one cycle). More specifically, the SRM of FIG. 1 can be operated as a 3-phase SRM. In this case, the coils 6 may be driven with respectively phase-shifted current waveforms (coils with the same reference numeral $6k$, where $K \in \{A, B, C\}$, in FIG. 1 are driven with the same phase-shifted waveform), i.e. coils 6A, 6B and 6c are driven by a corresponding current $I_K(\theta)$ (where $\theta$ is a rotation angle of the rotor 1) which satisfies $$I_A(\theta) = I_C\left(\theta - \frac{2\pi}{3}\right) = I_B\left(\theta - \frac{4\pi}{3}\right).$$

The current waveform is continuous and periodic, i.e. $I_K(\theta) = I_K(\theta + 2\pi)$ for all angles $\theta$. Further, the $n_r$=12-fold symmetry of the rotor 1 means that the current waveform repeats itself 12-fold over one revolution of the rotor 1, i.e. the period of the current waveform is given by $$T = \frac{1}{f * n_r}$$

(where f is the frequency of rotation of the rotor 1), and the rotational angle of rotor 1 at time t is therefore $$\theta(t) = \frac{2\pi t}{T}.$$

Thus, the drive currents for the SRM of FIG. 1 may be defined by a single-valued function specifying current values over one period $$T = \frac{1}{f * n_r}.$$

Figure 4:
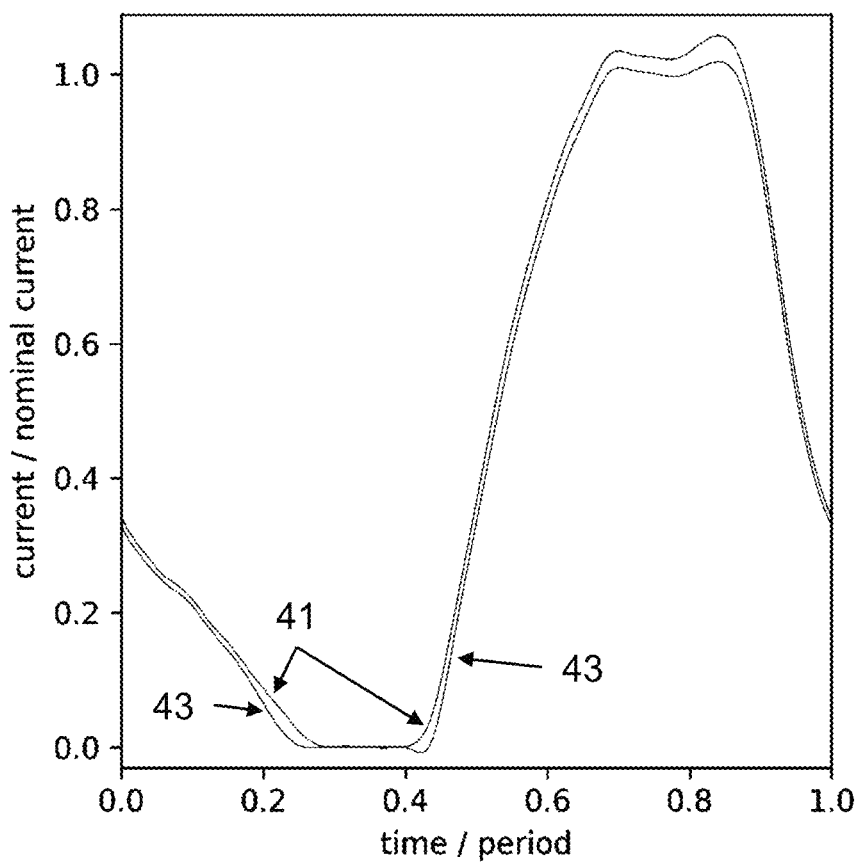
FIG. 4 illustrates upper and lower bounds of a drive current waveform for driving stator poles of the stator of FIG. 1.

A suitable waveform for driving the motor of FIG. 1 may be readily identified by performing an appropriate computational simulation of the motor during operation (conventional and commercially available simulation software may be used to perform such simulations). For example, such simulations may be used to iteratively improve/optimise an initial waveform "guess" (the simulation may take limitations of the inverter into account, for example, the inverter output may be limited to positive voltages/currents). In this way, example current waveforms for driving the motor of FIG. 1 have been identified by the inventors and are now described with reference to FIG. 4. The waveforms 41 and 43 shown in the graph of FIG. 4 represent respectively an upper waveform bound $P_{upper}(t)$ and a lower waveform bound $P_{lower}(t)$ which specify normalised current values over one period T (i.e. the current values are normalised with respect to a nominal drive current value which may represent a drive current at full drive power, e.g. 200 A). The SRM of FIG. 1 may be operated with a drive current waveform which lies in between the upper and lower bounds 41, 43, i.e. $P_{lower}(t) < I_K(t) < P_{upper}(t)$.

The upper and lower bounds 41, 43 may be defined using a sequence of piecewise polynomial functions. More specifically, the upper and lower bounds 41, 43 may be expressed as piecewise cubic polynomials on an evenly spaced grid. Mathematically, piecewise cubic functions P(t; $\{x_i\},\{c_{ji}\}$) may be defined by breakpoints $\{x_i\}$, coefficients $\{c_{ji}\}$, and the following construction:

$$k(x) = \max\{i: x_i \leq x,\ i = 0, 1, 2, \ldots\}$$

$$P(t; \{x_i\}, \{c_{ji}\}) = \sum_{m=0}^{3} c_{mk(x)}(t - x_{k(t)})^{3-m}$$

The respective break points breakpoints $\{x_i\}$ and coefficients $\{c_{ji}\}$ for the upper bound and lower bounds 41, 43 of FIG. 4 are given respectively in Table 1 and Table 2.

TABLE 1

| x[i] | c[0, i] | c[1, i] | c[2, i] | c[3, i] |
|---|---|---|---|---|
| 0 | −373.323 | 33.58275 | −2.32853 | 0.34205 |
| 0.03125 | 173.0888 | −1.41625 | −1.32332 | 0.29068 |
| 0.0625 | −375.739 | 14.81082 | −0.90474 | 0.25323 |
| 0.09375 | 349.2132 | −20.4147 | −1.07986 | 0.22795 |
| 0.125 | −247.251 | 12.32403 | −1.3327 | 0.18493 |
| 0.15625 | 199.1973 | −10.8558 | −1.28681 | 0.14777 |
| 0.1875 | −131.193 | 7.81896 | −1.38172 | 0.10304 |
| 0.21875 | 157.7718 | −4.48036 | −1.27738 | 0.06349 |
| 0.25 | 59.36887 | 10.31074 | −1.09518 | 0.02401 |
| 0.28125 | −232.297 | 15.87657 | −0.27683 | 0.00167 |
| 0.3125 | 107.0701 | −5.9013 | 0.0349 | 0.00143 |
| 0.34375 | −90.1919 | 4.13652 | −0.02025 | 3.00E−05 |
| 0.375 | 215.3981 | −4.31896 | −0.02595 | 0.00068 |
| 0.40625 | 639.1797 | 15.87461 | 0.33516 | 0.00222 |
| 0.4375 | −857.131 | 75.7977 | 3.19992 | 0.04771 |
| 0.46875 | 125.082 | −4.55828 | 5.42615 | 0.19557 |
| 0.5 | −284.438 | 7.16815 | 5.50771 | 0.3645 |
| 0.53125 | 46.35379 | −19.4979 | 5.12241 | 0.53494 |
| 0.5625 | 147.8982 | −15.1522 | 4.03959 | 0.67739 |
| 0.59375 | −228.133 | −1.28676 | 3.52587 | 0.79334 |
| 0.625 | 321.0824 | −22.6742 | 2.77709 | 0.8953 |
| 0.65625 | −620.243 | 7.42726 | 2.30062 | 0.96974 |
| 0.6875 | 657.6039 | −50.7205 | 0.94771 | 1.02996 |
| 0.71875 | −182.019 | 10.92985 | −0.29575 | 1.03012 |
| 0.75 | 270.2227 | −6.13444 | −0.14589 | 1.02599 |
| 0.78125 | −227.367 | 19.19894 | 0.26237 | 1.02369 |
| 0.8125 | −276.057 | −2.11675 | 0.79619 | 1.0437 |
| 0.84375 | −449.991 | −27.9971 | −0.14486 | 1.05809 |
| 0.875 | 319.3301 | −70.1837 | −3.21301 | 1.01249 |
| 0.90625 | 786.4246 | −40.2465 | −6.66396 | 0.85329 |
| 0.9375 | 61.19588 | 33.48082 | −6.87538 | 0.62974 |
| 0.96875 | −60.1086 | 39.21793 | −4.60355 | 0.44944 |

TABLE 2

| x[i] | c[0, i] | c[1, i] | c[2, i] | c[3, i] |
|---|---|---|---|---|
| 0 | −305.845 | 28.92415 | −2.20194 | 0.32877 |
| 0.03125 | 130.2671 | 0.25122 | −1.29021 | 0.27888 |
| 0.0625 | −325.198 | 12.46376 | −0.89287 | 0.24278 |
| 0.09375 | 287.1394 | −18.0235 | −1.06661 | 0.21712 |
| 0.125 | −186.666 | 8.8958 | −1.35185 | 0.17495 |
| 0.15625 | 50.51431 | −8.60416 | −1.34274 | 0.1357 |
| 0.1875 | 170.1673 | −3.86844 | −1.73251 | 0.08688 |
| 0.21875 | 85.98653 | 12.08474 | −1.47575 | 0.03415 |
| 0.25 | −251.979 | 20.14597 | −0.46854 | 0.00246 |
| 0.28125 | 55.369 | −3.47709 | 0.05236 | −0.0002 |
| 0.3125 | −46.396 | 1.71375 | −0.00274 | −0.00027 |
| 0.34375 | 85.52181 | −2.63587 | −0.03156 | −0.0001 |
| 0.375 | −276.477 | 5.3818 | 0.05425 | −0.00105 |
| 0.40625 | 1480.673 | −20.5379 | −0.41937 | −0.00253 |
| 0.4375 | −1448.62 | 118.2752 | 2.63492 | 0.00949 |
| 0.46875 | 232.5341 | −17.5331 | 5.78311 | 0.16313 |
| 0.5 | −164.674 | 4.26695 | 5.36854 | 0.33382 |
| 0.53125 | −96.2515 | −11.1712 | 5.15278 | 0.50073 |
| 0.5625 | 205.3256 | −20.1948 | 4.17259 | 0.64791 |
| 0.59375 | −218.226 | −0.94552 | 3.51196 | 0.76485 |
| 0.625 | 289.0866 | −21.4042 | 2.81353 | 0.86701 |
| 0.65625 | −567.38 | 5.69763 | 2.3227 | 0.94286 |
| 0.6875 | 579.6662 | −47.4942 | 1.01655 | 1.00369 |
| 0.71875 | −121.858 | 6.84946 | −0.2536 | 1.00677 |
| 0.75 | 189.2459 | −4.57477 | −0.18251 | 1.00181 |
| 0.78125 | −129.29 | 13.16704 | 0.086 | 0.99742 |
| 0.8125 | −244.443 | 1.04608 | 0.53016 | 1.00902 |
| 0.84375 | −511.494 | −21.8705 | −0.12061 | 1.01914 |
| 0.875 | 272.9554 | −69.823 | −2.98603 | 0.97841 |
| 0.90625 | 868.1212 | −44.2335 | −6.55029 | 0.82524 |
| 0.9375 | 31.17326 | 37.15289 | −6.77156 | 0.60384 |
| 0.96875 | −118.947 | 40.07539 | −4.35818 | 0.42946 |

Figure 5:
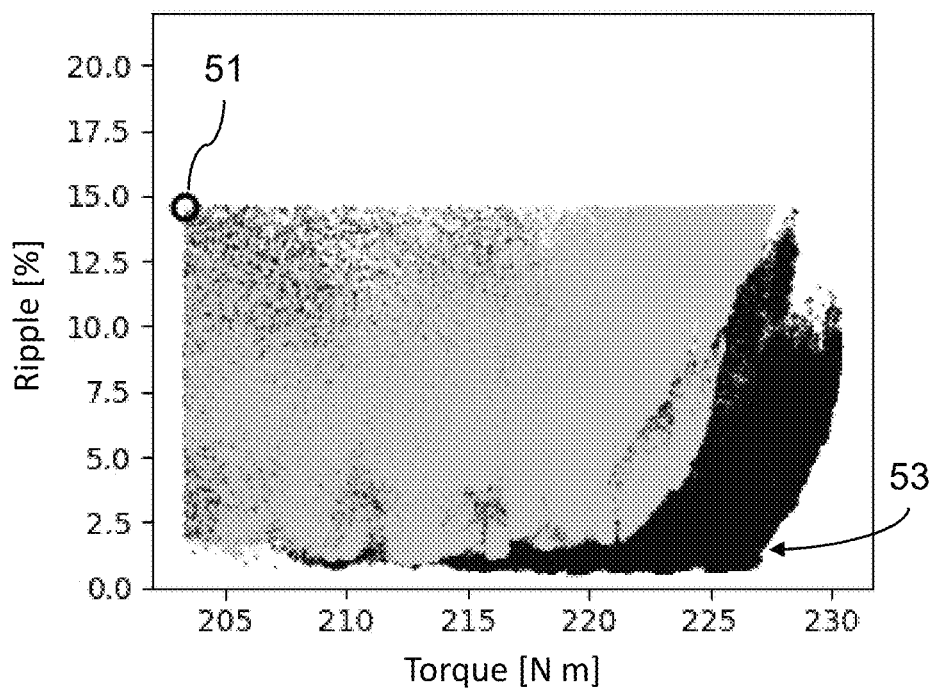
FIGS. 5 and 6 illustrate simulated performance parameters.

Further, by simulating the operation of the switched reluctance motors, the inventors have found that the output of such motors can be improved over designs employing conventional regularly shaped rotor teeth, with the use of irregularly shaped teeth such as those illustrated in FIGS. 1 to 3. FIG. 5 illustrates the results for a set of simulated tooth shapes, each point in the plot showing a result for a given tooth shape. In particular, FIG. 5 illustrates the results of approximately one million different tooth shapes (the outer diameter $r_{max}$ of the rotor and the number of rotor teeth $n_r$ is same for all shown data points). The large number of simulations performed and illustrated means that the data points in the Figure are not necessarily individually identifiable and the data set is shown more as shading where darker areas indicate a greater density of data points and lighter areas indicate a lower density of data points. More specifically, the simulation results shown in FIGS. 5 and 6 correspond to a predicted performance of the motor at an operating point of f=2768 rotations per minute and a nominal drive current of $I_{norm}$=200 A.

Figure 6:
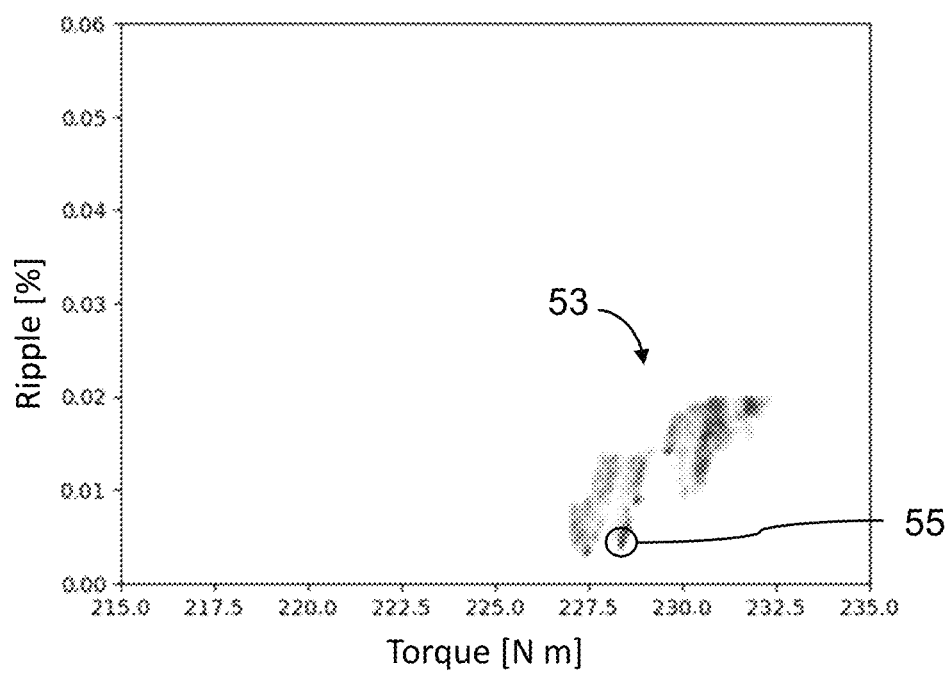

The circle 51 in FIG. 5 indicates a conventional design with regularly shaped rotor teeth which results in a predicted output torque of less than 205 N/m with a torque ripple of more than 14%. FIG. 6 shows a group of data points 53 of extracted from FIG. 5 which are identified as a group of optimal tooth shapes, specifically shapes resulting in a predicted output torque exceeding 227 N/m and torque ripple of less than 2% (when driven with a drive current waveform that lies within the upper and lower bounds 41, 43 described above). In particular, the circle 55 indicates the predicted performance for the tooth shape shown in FIGS. 1 to 3 which results in a predicted torque exceeding 228 N/m and torque ripple of less than 0.5%.

Figure 7:
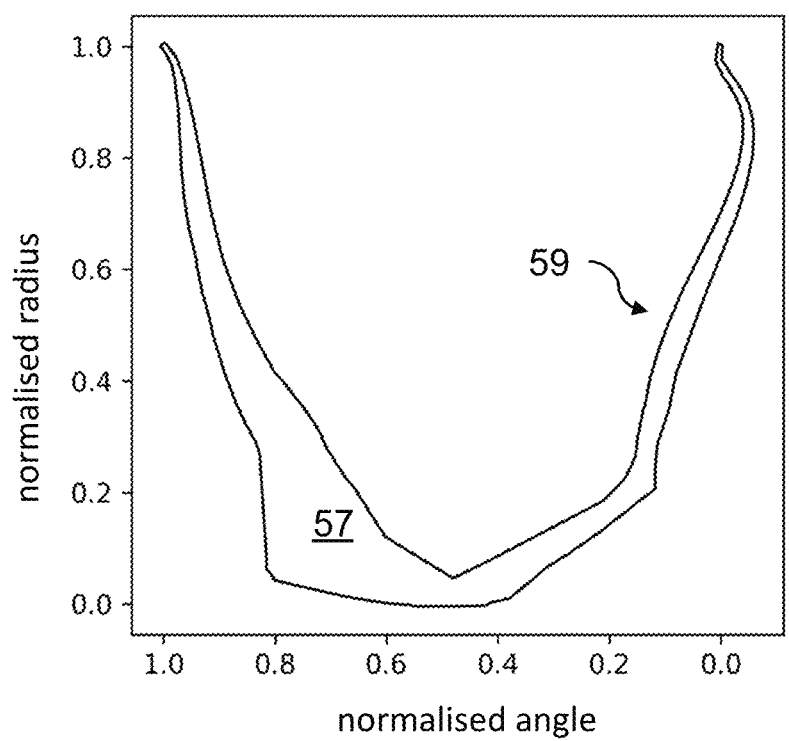
FIG. 7 shows a polygon defining a range of rotor slot profiles.

The identified group of tooth shapes correspond to a set of slot profiles that, when expressed in normalised radial and angular coordinates, are contained within a region 57 enclosed by a polygon 59 as shown in FIG. 7. Thus, the polygon 20 defines boundaries of the enclosed region 57 in the (normalised) polar coordinate system and embodiments lie within the region 57. In other words, all slot profiles that lie within the polygon 59 of FIG. 7 exhibit desired torque and torque ripple characteristics, e.g. a predicted output torque exceeding 227 N/m and torque ripple of less than 2% (for f=2768 rotations per minute and $I_{norm}$=200 A). The polygon 59 can be defined by a sequence of normalised coordinates which represent the polygon's vertices (each coordinate is an ordered pair comprising a normalised angular value and a normalised radial value. The polygon 59 can then be readily reconstructed from the sequence by linear interpolation between vertices (i.e. by connecting successive coordinates with a straight line). The WKT representation of the polygon 59, in ($\varphi_{norm}$, $r_{norm}$) coordinates, reads:

POLYGON ((0.42242−0.00244, 0.41315 0.00244, 0.37738 0.01113, 0.31221 0.06593, 0.27282 0.09056, 0.21648 0.12963, 0.11751 0.20699, 0.11737 0.24054, 0.11385 0.28571, 0.09277 0.34885, 0.07981 0.4127, 0.02934 0.55067, −0.02808 0.69306, −0.0469 0.75422, −0.05749 0.80562, −0.05986 0.84371, −0.05629 0.87459, −0.04921 0.90035, −0.03859 0.92121, −0.00235 0.97436, −0.00338 1.00302, 0.00461 1.00413, 0.00934 0.974, −0.00366 0.94692, −0.02113 0.92063, −0.03404 0.89499, −0.03991 0.87057, −0.03991 0.83394, −0.03286 0.79365, −0.0223 0.75824, −0.00587 0.71551, 0.00822 0.68376, 0.06916 0.56091, 0.09615 0.49741, 0.11259 0.45224, 0.12671 0.40451, 0.13498 0.3602, 0.14082 0.33968, 0.14904 0.29816, 0.15258 0.26618, 0.1608 0.24664, 0.17371 0.22222, 0.21009 0.18559, 0.4108 0.08059, 0.48005 0.0464, 0.60211 0.12088, 0.65747 0.20825, 0.67606 0.23077, 0.70775 0.28083, 0.7208 0.31071, 0.73963 0.34012, 0.77844 0.39027, 0.80047 0.41514, 0.83099 0.47009, 0.86385 0.53724, 0.89319 0.61661, 0.91432 0.70208, 0.94603 0.86837, 0.96484 0.94541, 0.97672 0.97992, 0.99448 1.00208, 0.9972 1.00479, 1.00055 1.00474, 1.0045 1.0019, 1.00464 0.99842, 1.00117 0.99512, 0.98592 0.96825, 0.98005 0.94139, 0.973 0.88034, 0.9683 0.78621, 0.96361 0.73126, 0.9542 0.67131, 0.94131 0.61905, 0.94012 0.60538, 0.93073 0.5602, 0.91667 0.50916, 0.91075 0.48072, 0.89076 0.41467, 0.86963 0.35973, 0.85197 0.32177, 0.83451 0.2906, 0.82746 0.26984, 0.81455 0.07204, 0.81559 0.0617, 0.81103 0.05861, 0.80013 0.04309, 0.79612 0.04157, 0.67276 0.01345, 0.61279 0.00367, 0.57054− 0.00122, 0.55634−0.00122, 0.54941−0.00366, 0.48122−0.00366, 0.42242 −0.00244)).

Conventional and readily available software tools may be used to plot the polygon 59 or the profile 15 (e.g. online WKT plotting tools such as on https://www.geometrymapper.com) or to test whether a particular surface profile (expressed in ($\varphi_{norm}$, $r_{norm}$) coordinates) lies within the area enclosed by the polygon 59. For example, the C/C++ library "GEOS" may be used to read in i) a WKT representation of the surface profile in question and ii) the above WKT representation of the polygon 59, and to implement the test "GEOSContains" to determine whether the profile in question lies (completely) within the polygonal area 57.

Referring back to the graph of FIG. 6, the points 53 show predicted torque and toque ripple values for more than 10,000 different rotor slot profiles selected from the group of profiles defined by polygon 59. It is evident that each of these rotor slot profiles has improved predicted torque and torque ripple values (specifically output torque exceeding 227 N/m and torque ripple of less than 2% for the above described operating conditions) compared to the aforementioned conventional design.

Various modifications will be apparent to those skilled in the art. For example, in some embodiments, the number of rotor teeth and stator poles may be different than the corresponding numbers in the embodiment of FIG. 1 (i.e. the rotor may have more than or less than 12 rotor teeth and the stator may have more than or less than 16 stator poles).

By way of example only, the following provides indicative numbers of slots and poles for different SRM designs:
three-phase SRMs: 6/2; 6/4; 6/8; 6/14; 12/8; 18/12; 24/16;
four-phase SRMs: 8/6; 8/10; 16/12; 24/18; 32/24;
five-phase SRMs: 10/4; 10/6; 10/8; 10/12;
xix-phase SRMs: 12/10; 12/14; 24/20;
seven-phase SRMs: 14/10; 14/12; 14/16.

It is noted in particular that it may be advantageous to have a number of rotor teeth (poles) Nr that is greater than the number of stator poles Ns. Such designs may have relatively high efficiency, output power and lower torque ripple. For example, Nr=2*Ns−2, so 10/6, 14/8, and 18/10 etc.

Figures 8A, 8B:
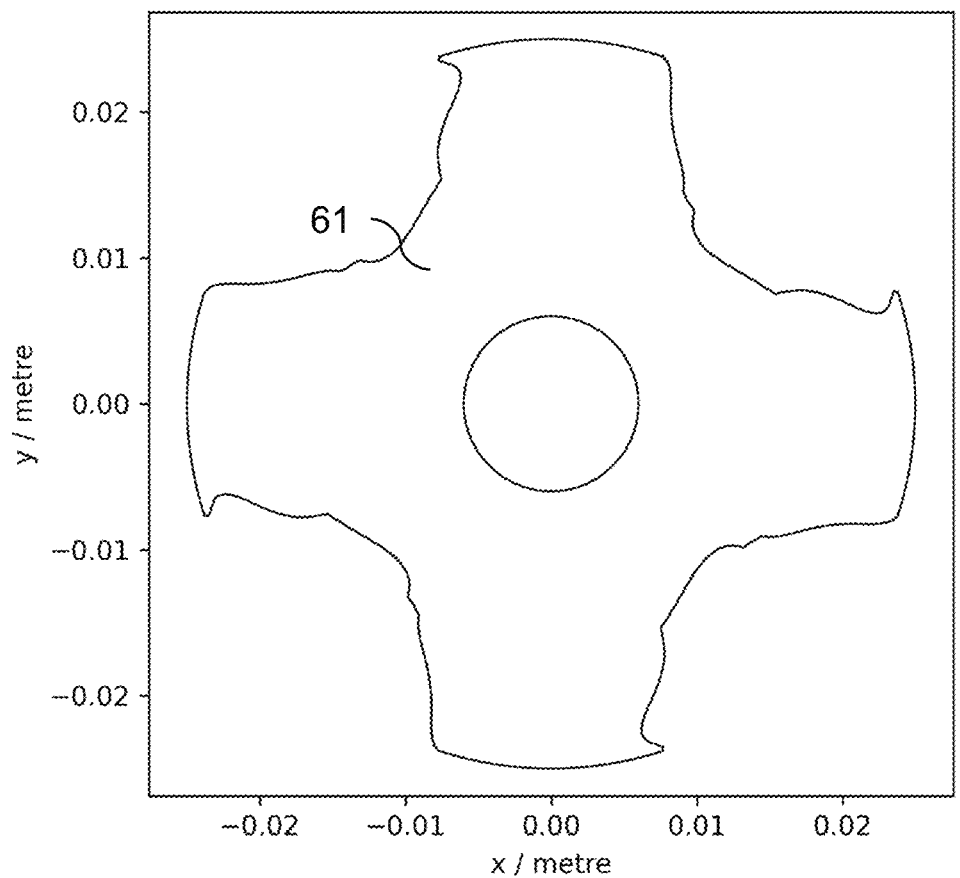
Figures 9A, 9B:
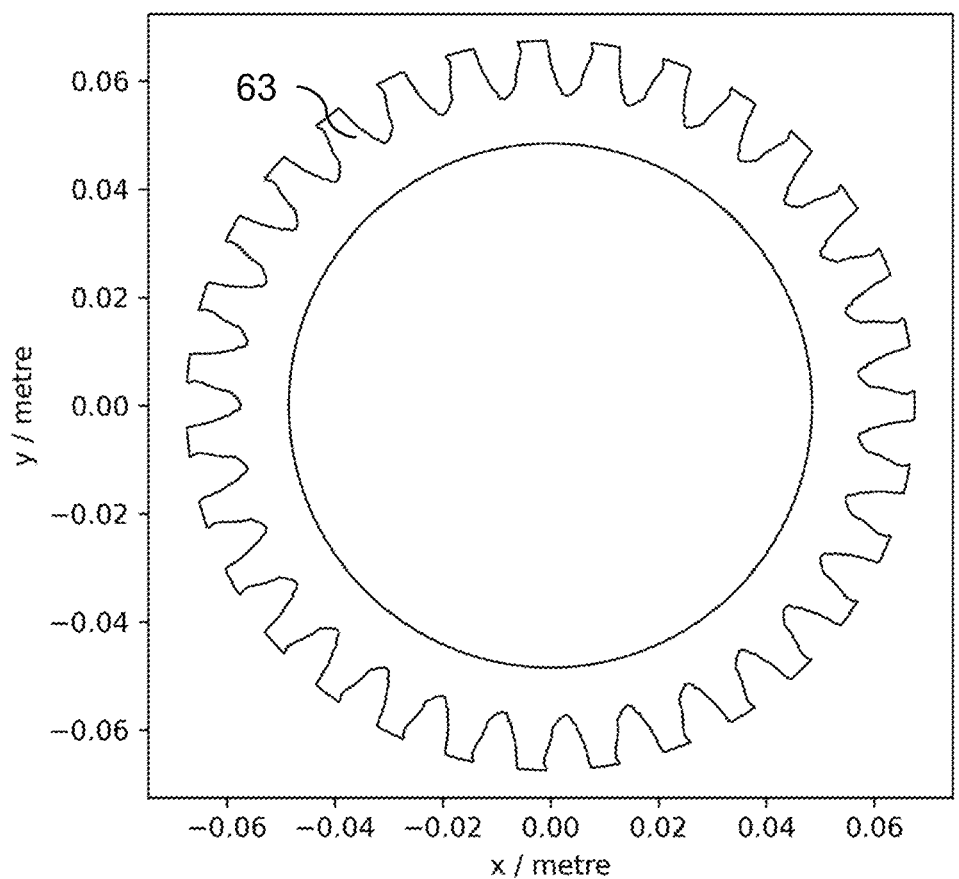
Figures 10A, 10B:
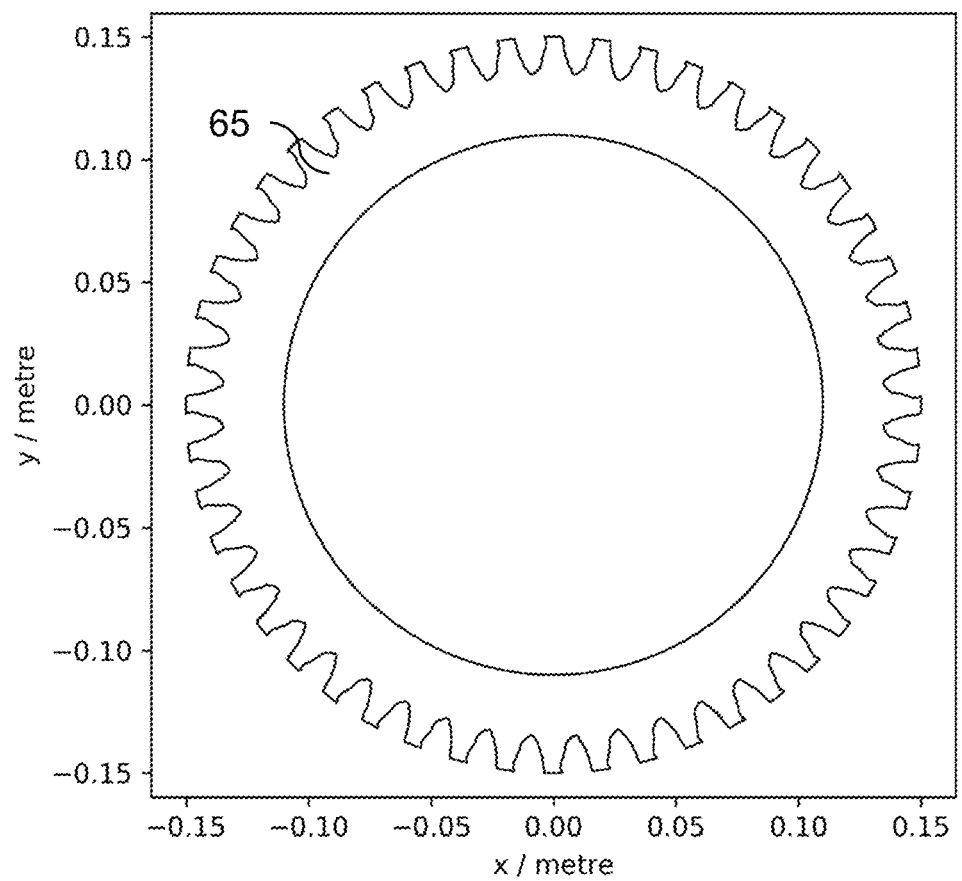

FIGS. 8A to 10B illustrate variations of the above described rotor 1. FIG. 8A is cross-sectional view of rotor 61 comprising four rotor teeth. The slots between adjacent teeth of the rotor 61 have the transverse cross-sectional profile 15 of FIG. 4 (i.e. a profile that lies within the polygon 59). FIG. 8B is a table containing numerical values of parameters specifying the rotor 61 such as the minimum radius Imin, the outer diameter $r_{max}$, the angles $\varphi_{min}$ and $\varphi_{max}$ indicating the end points of a slot, and the shaft diameter. Similarly, FIGS. 9A and 10A are cross-sectional views of rotors 63, 65 respectively comprising 31 and 48 rotor teeth (the slots between adjacent teeth of the rotors 63, 65 have the transverse cross-sectional profile 15 of FIG. 4). The tables of FIGS. 9B and 10B respectively contain numerical values of parameters specifying the rotors 63, 65. It is to be understood that the rotors 61, 63, 65 of FIGS. 8A, 9A and 10A are intended to be used with appropriately configured stators (e.g. conventional stators that are appropriately dimensioned and that have a suitable number of stator poles). For example, a corresponding stator for use with rotor 61, 63 or 65 may have respectively 6, 48 or 72 stator poles.

In embodiments, the substantially circular cylindrical envelope of the above described rotors may have a diameter in a range of 20 mm to 250 mm (preferably in a range 100 mm to 150 mm).

In embodiments, the length of the above described rotors may be in the range of 20 mm to 250 mm (i.e. the rotors may extend along their rotational axis for a length in the range of 20 mm to 250 mm). In some embodiments, the rotor length may be in the range of 100 mm to 150 mm.

The above described embodiments may be manufactured with known manufacturing methods (e.g. die casting, machining, additive manufacturing, and the like). It is to be understood that, as in conventional SRMs, in the above described embodiments the rotors, e.g. rotor 1, may not comprise permanent magnets or windings but may comprise a ferroelectric material (e.g. iron).

The invention claimed is:

1. A switched reluctance electrical motor comprising:
   a rotor having a substantially circular cylindrical envelope with a diameter in a range of 50 mm to 300 mm and a length in the range of 20 mm to 250 mm, and comprising a plurality of radially extending rotor teeth, each of the rotor teeth having a smooth, curved radially outer surface and asymmetric side walls, one side wall of the asymmetric side walls having an overhanging portion that projects from each of the rotor teeth in a rotational direction, and
   a stator surrounding the rotor and comprising a plurality of stator poles, and the rotor teeth are circumferentially-spaced apart from each other to define slots between adjacent teeth formed by the asymmetric side walls of adjacent rotor teeth that, expressed in normalised angular and radial coordinates $\varphi_{norm}$ and $r_{norm}$ respectively defined by $$\varphi_{norm} = \frac{\varphi_0 - \varphi_{min}}{\varphi_{max} - \varphi_{min}} \text{ and } r_{norm} = \frac{r_0 - r_{min}}{r_{max} - r_{min}},$$

$r_{norm}$ being less than or equal to 1 and greater than or equal to 0, have a cross-sectional profile transverse to an axis of rotation of the rotor, lying within a polygonal region having a corresponding Well-known text, WKT, representation of:
POLYGON ((0.42242 −0.00244, 0.41315 0.00244, 0.37738 0.01113, 0.31221 0.06593, 0.27282 0.09056, 0.21648 0.12963, 0.11751 0.20699, 0.11737 0.24054, 0.11385 0.28571, 0.09277 0.34885, 0.07981 0.4127, 0.02934 0.55067, −0.02808 0.69306, −0.0469 0.75422, −0.05749 0.80562, −0.05986 0.84371, −0.05629 0.87459, −0.04921 0.90035, −0.03859 0.92121, −0.00235 0.97436, −0.00338 1.00302, 0.00461 1.00413, 0.00934 0.974, −0.00366 0.94692, −0.02113 0.92063, −0.03404 0.89499, −0.03991 0.87057, −0.03991 0.83394, −0.03286 0.79365, −0.0223 0.75824, −0.00587 0.71551, 0.00822 0.68376, 0.06916 0.56091, 0.09615 0.49741, 0.11259 0.45224, 0.12671 0.40451, 0.13498 0.3602, 0.14082 0.33968, 0.14904 0.29816, 0.15258 0.26618, 0.1608 0.24664, 0.17371 0.22222, 0.21009 0.18559, 0.4108 0.08059, 0.48005 0.0464, 0.60211 0.12088, 0.65747 0.20825, 0.67606 0.23077, 0.70775 0.28083, 0.7208 0.31071, 0.73963 0.34012, 0.77844 0.39027, 0.80047 0.41514, 0.83099 0.47009, 0.86385 0.53724, 0.89319 0.61661, 0.91432 0.70208, 0.94603 0.86837, 0.96484 0.94541, 0.97672 0.97992, 0.99448 1.00208, 0.9972 1.00479, 1.00055 1.00474, 1.0045 1.0019, 1.00464 0.99842, 1.00117 0.99512, 0.98592 0.96825, 0.98005 0.94139, 0.973 0.88034, 0.9683 0.78621, 0.96361 0.73126, 0.9542 0.67131, 0.94131 0.61905, 0.94012 0.60538, 0.93073 0.5602, 0.91667 0.50916, 0.91075 0.48072, 0.89076 0.41467, 0.86963 0.35973, 0.85197 0.32177, 0.83451 0.2906, 0.82746 0.26984, 0.81455 0.07204, 0.81559 0.0617, 0.81103 0.05861, 0.80013 0.04309, 0.79612 0.04157, 0.67276 0.01345, 0.61279 0.00367, 0.57054−0.00122, 0.55634−0.00122, 0.54941 −0.00366, 0.48122−0.00366, 0.42242−0.00244)).

2. The switched reluctance motor according to claim 1, wherein a number of rotor teeth is 12 and a number of stator poles is 18.

3. The switched reluctance motor according to claim 1, wherein a number of rotor teeth is 4 and a number of stator poles is 6.

4. The switched reluctance motor according to claim 1, wherein a number of rotor teeth is 31 and a number of stator poles is 48.

5. The switched reluctance motor according to claim 1, wherein a number of rotor teeth is 48 and a number of stator poles is 72.

6. The switched reluctance motor according to claim 1, wherein the substantially circular cylindrical envelope of the rotor has a diameter in a range of 100 mm to 150 mm.

7. The switched reluctance motor according to claim 1, wherein the rotor has a length in the range of 100 mm to 150 mm.

* * * * *